US008826619B2

(12) United States Patent
Cai

(10) Patent No.: US 8,826,619 B2
(45) Date of Patent: Sep. 9, 2014

(54) WOOD-FIBERGLASS HYBRID PANEL DOOR

(71) Applicant: MaxCraft Doors, Inc., Suwanee, GA (US)

(72) Inventor: Zhihua Cai, Suwanee, GA (US)

(73) Assignee: MaxCraft Doors, Inc., Suwanee, GA (US)

( * ) Notice: Subject to any disclaimer, the term of this patent is extended or adjusted under 35 U.S.C. 154(b) by 0 days.

(21) Appl. No.: 13/866,599

(22) Filed: Apr. 19, 2013

(65) Prior Publication Data

US 2013/0283716 A1 Oct. 31, 2013

(30) Foreign Application Priority Data

Apr. 28, 2012 (CN) .......................... 2012 1 0128176

(51) Int. Cl.
*E06B 3/72* (2006.01)
*E06B 3/30* (2006.01)
*B32B 3/28* (2006.01)

(52) U.S. Cl.
USPC ................... 52/455; 52/313; 52/316; 52/479; 52/483.1; 52/784.1; 52/794.1; 52/796.1

(58) Field of Classification Search
USPC ............. 52/455, 782.1, 783.1, 783.13, 796.1, 52/784.1, 784.15, 794.1, 313, 316, 309.9, 52/309.15, 475.1, 479, 483.1
See application file for complete search history.

(56) References Cited

U.S. PATENT DOCUMENTS

| | | | | |
|---|---|---|---|---|
| 3,807,105 | A * | 4/1974 | Rudkin et al. | 52/79.7 |
| 4,560,523 | A * | 12/1985 | Plumley et al. | 264/102 |
| 4,716,705 | A * | 1/1988 | Formanek et al. | 52/784.1 |
| 5,075,059 | A * | 12/1991 | Green | 264/129 |
| 6,092,343 | A * | 7/2000 | West et al. | 52/309.11 |
| 6,932,937 | B2 * | 8/2005 | Minami et al. | 264/511 |
| 6,952,903 | B2 * | 10/2005 | West et al. | 52/455 |
| 7,284,352 | B2 * | 10/2007 | Lynch et al. | 52/455 |
| 2003/0200714 | A1 * | 10/2003 | Minke et al. | 52/423 |
| 2009/0044471 | A1 * | 2/2009 | Harlin et al. | 52/309.13 |
| 2009/0113830 | A1 * | 5/2009 | Clark et al. | 52/455 |

* cited by examiner

*Primary Examiner* — Jeanette E. Chapman
(74) *Attorney, Agent, or Firm* — Zarley Law Firm, P.L.C.

(57) ABSTRACT

A wood-fiberglass hybrid panel door featuring natural wood veneer permanently bonded to at least one side of a fiberglass door. The panel and the stile/rail portions of the fiberglass door skin for bonding wood veneers can be either one-piece compression molded construction or can be separately compression molded pieces joined together by mechanical or chemical methods. The two pieces of door skins are used to make a fiberglass door first. Wood veneer is then bonded to at least one side of the said fiberglass door through the use of a vacuum press. Wood raised molding or flush sticking is applied around the veneered panel to cover the veneer edges on the panel and/or stiles/rails. Wood raised molding or flush sticking is fixed to the door by mechanical or chemical methods.

11 Claims, 5 Drawing Sheets

WOOD-FIBERGLASS HYBRID PANEL DOOR

RELATED APPLICATION

This application is a continuation application of China Patent Application No. 201210128176.7, filed on Apr. 28, 2012 in the China Intellectual Property Office.

FIELD OF INVENTION

The present invention relates to the construction industry, particularly a wood-fiberglass hybrid panel entry door featuring natural wood veneer permanently bonded to a fiberglass panel door.

BACKGROUND OF THE INVENTION

Wood entry doors are popular because of their natural beauty, but they are not energy efficient and will warp, swell and rot over time. Fiberglass doors are very durable and energy efficient, but they lack the warmth and beauty of natural wood.

SUMMARY OF THE INVENTION

The object of this invention is to provide an entry door that combines the best of both wood and fiberglass doors, i.e., the beauty of natural wood doors and the durability and energy efficiency of fiberglass doors. The structure of the present invention is used in conjunction with a fiberglass panel door. The natural wood veneer is bonded to at least one side of the door. The fiberglass panel door is constructed of stiles/rails and at least one panel.

The panel and the stile/rail portions of the fiberglass door skin can be either one-piece compression molded construction or separately compression molded pieces joined together by mechanical or chemical methods. The natural wood veneer is individually bonded to the surfaces of the fiberglass door panel portion and the stile and rail portion. Decorative solid wood molding or sticking is then applied around the panel to cover the edges of the veneers bonded to the panel portion and the stile and rail portion, making the veneered fiberglass panel door look just like a natural wood door.

DETAILED DESCRIPTION OF THE PREFERRED EMBODIMENTS

Embodiment 1

Figure 1:
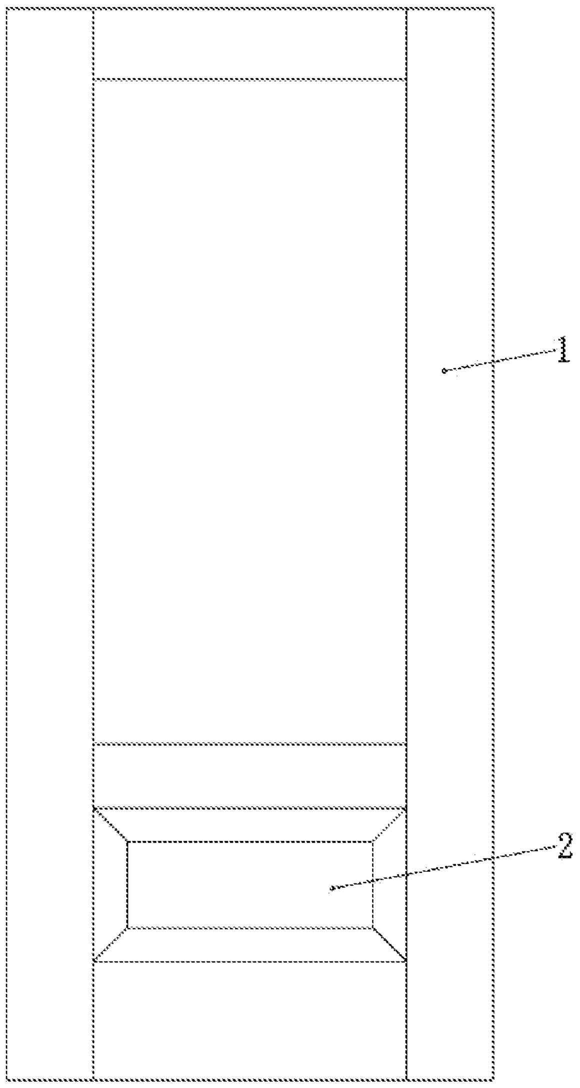
FIG. 1 is the construction of a typical fiberglass panel door skin with stiles/rails and at least one panel
Figure 2:
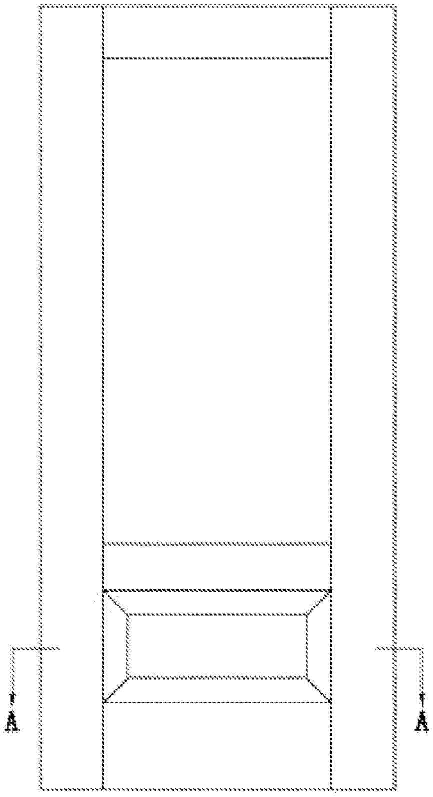
FIG. 2 is a fiberglass door skin with the panel and stiles/rails being of one-piece compression molded construction
Figure 5:
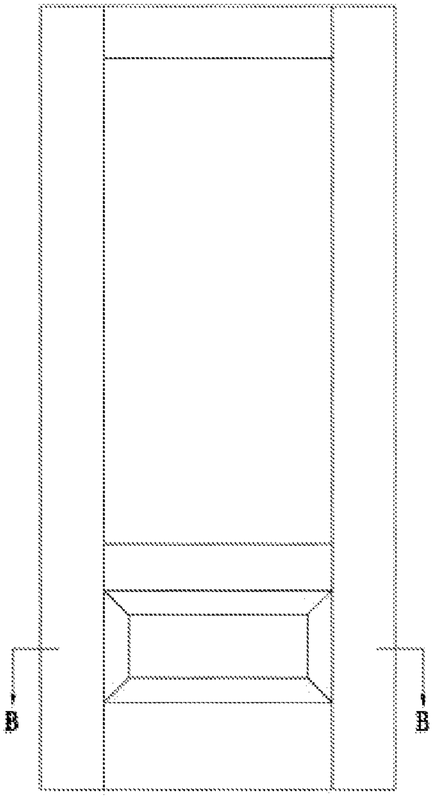
FIG. 5 is a fiberglass door skin with the panel and stile/rail being separately compression molded and joined together by mechanical or chemical methods
Figure 3:
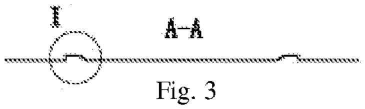
FIG. 3 is the sectional view taken along line A-A in FIG. 2
Figure 6:
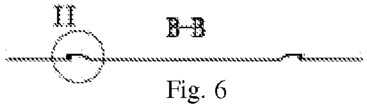
FIG. 6 is the sectional view taken along line B-B in FIG. 5
Figure 4:
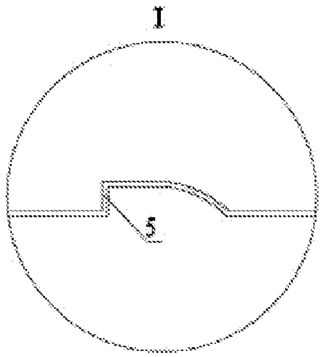
FIG. 4 is an enlarged sectional view taken along line A-A in FIG. 2
Figure 7:
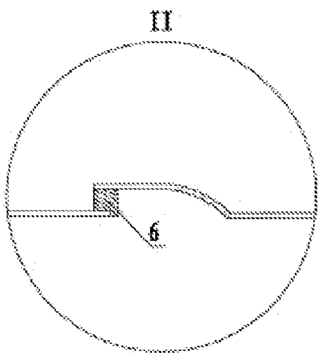
FIG. 7 is an enlarged sectional view taken along line B-B in FIG. 5
Figure 8:
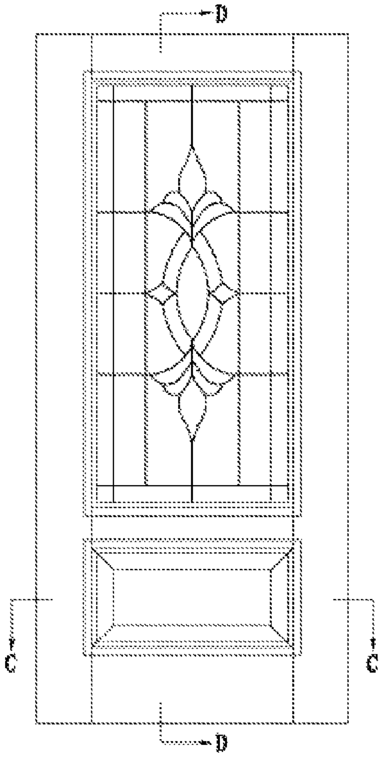
FIG. 8 is a wood-fiberglass hybrid door constructed of one-piece door skins and natural wood veneer bonded to one side of the door with applied wood raised molding on the same side
Figure 9:
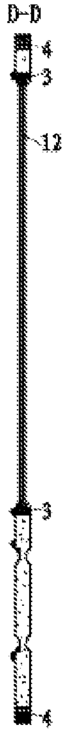
FIG. 9 is a sectional view taken along line D-D in FIG. 8
Figure 10:
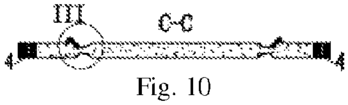
FIG. 10 is a sectional view taken along line C-C in FIG. 8
Figure 11:
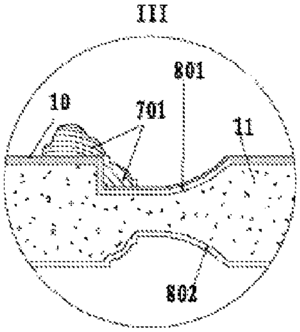
FIG. 11 is an enlarged sectional view taken along line C-C in FIG. 8

This embodiment shows a wood-fiberglass hybrid door constructed of one-piece door skins and natural wood veneer bonded to one side of the door with applied wood raised molding on the same side (FIG. 8-FIG. 11)

Step 1: Preparation of the following materials: Internal blocks 3, wood stiles/rails 4, wood raised molding 701, natural wood veneer 10, one-piece construction fiberglass door skins 801 and 802, foam core 11 and decorative glass 12.

Step 2: Make a fiberglass using the above materials plus water resistant adhesives (known knowledge)

Step 3: Lightly sand the surface of door skin 801, apply water resistant adhesive to one side of wood veneer 10 and then bond the wood veneer 10 to the surface of door skin 801 through the use of a vacuum press.

Step 4: Once the adhesive is cured, apply wood raised molding on the veneered side by mechanical or chemical methods. Then install glass 12.

Embodiment 2

Figure 12:
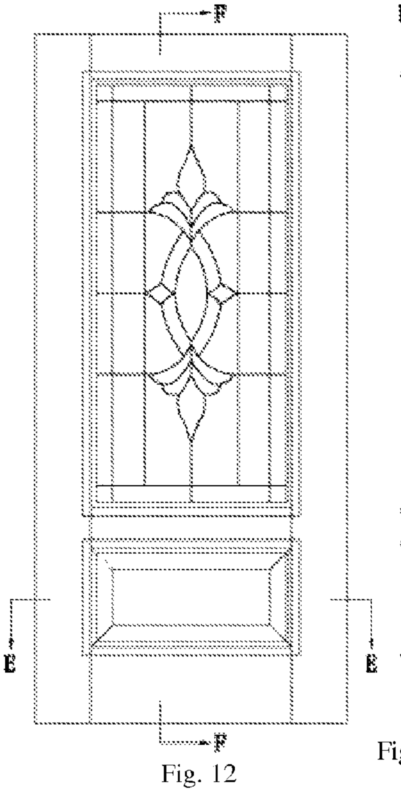
FIG. 12 is a wood-fiberglass hybrid door constructed of one-piece fiberglass door skins and natural wood veneer bonded to both sides of the door with applied raised molding on both sides
Figure 13:
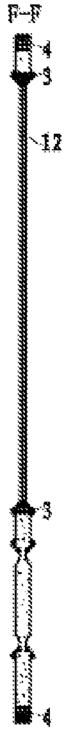
FIG. 13 is a sectional view taken along line E-E in FIG. 12
Figure 14:
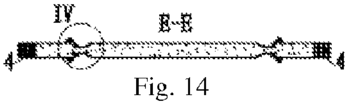
FIG. 14 is a sectional view taken along line F-F in FIG. 12
Figure 15:
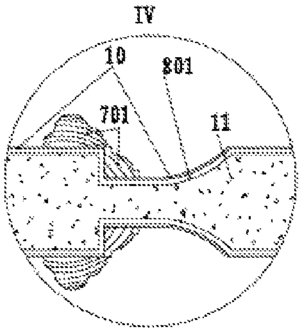
FIG. 15 is an enlarged sectional view taken along line E-E in FIG. 12

This embodiment shows a wood-fiberglass hybrid door constructed of one-piece door skins and natural wood veneer bonded to both sides of the door with applied wood raised molding on both sides (FIG. 12-FIG. 15).

Step 1: Preparation of the following materials: Internal blocks 3, wood stiles/rails 4, wood raised molding 701, natural wood veneer 10, one-piece construction fiberglass door skins 801 and 802, foam core 11 and decorative glass 12.

Step 2: Make a fiberglass door using the above materials plus water resistant adhesives (known knowledge)

Step 3: Lightly sand the surface of door skin 801, apply water resistant adhesive to one side of wood veneer 10 and then bond the wood veneer 10 to the surface of door skin 801 and 802 through the use of a vacuum press.

Step 4: Once the adhesive is cured, apply wood raised molding on both sides by mechanical or chemical methods. Then install glass 12.

Embodiment 3

Figure 16:
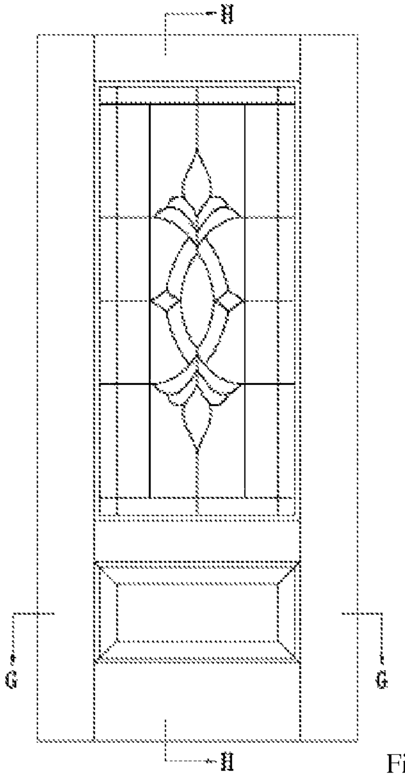
FIG. 16 is a wood-fiberglass hybrid door constructed of two different types of fiberglass doors skins. One skin is of one-piece compression molded construction and the other skin is constructed of separately compression molded pieces joined together by mechanical or chemical methods. Flush wood sticking is applied on the veneered side.
Figure 17:
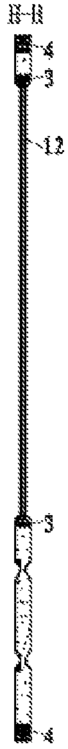
FIG. 17 is a sectional view taken along line H-H in FIG. 16
Figure 20:
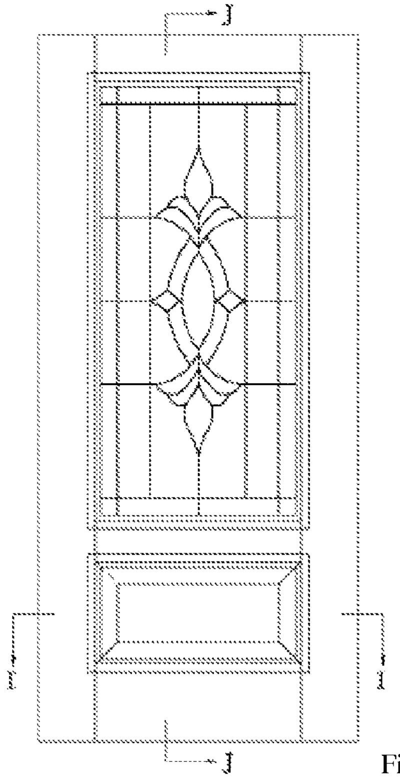
FIG. 20 is a wood-fiberglass hybrid door constructed of two different types of fiberglass doors skins. One skin is of one-piece compression molded construction and the other skin is constructed of separately compression molded pieces joined together by mechanical or chemical methods. Raised wood molding is applied on the veneered side.
Figure 21:
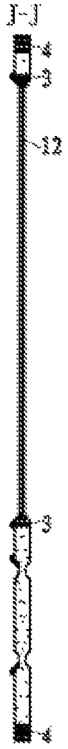
FIG. 21 is a sectional view taken along line J-J in FIG. 20
Figure 18:
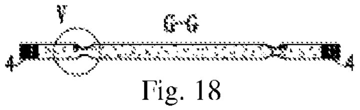
FIG. 18 is a sectional view taken along line G-G in FIG. 16
Figure 22:
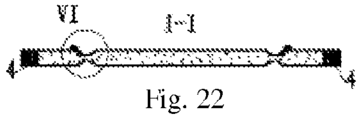
FIG. 22 is a sectional view taken along line I-I in FIG. 20
Figure 19:
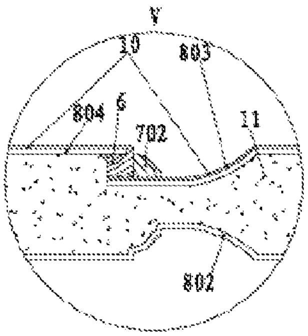
FIG. 19 is an enlarged sectional view taken along line G-G in FIG. 16
Figure 23:
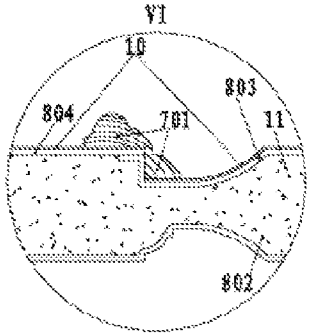
FIG. 23 is an enlarged sectional view taken along line I-I in FIG. 20

This embodiment shows a wood-fiberglass hybrid door constructed of two different types of fiberglass door skins. The first door skin is of one-piece compression molded construction and the second door skin is constructed of a separately compression molded piece joined together by mechanical or chemical methods. Flush wood molding is applied on the veneered side. (FIG. 16-FIG. 19).

Step 1: Preparation of the following materials: Internal blocks 3, wood stiles/rails 4, wood or composite board 6 (to connect the separately compression molded panel skin with separately compression molded stile/rail skin), natural wood veneer 10, one-piece construction fiberglass door skin 801, door panel skin 803, stile/rail skin 804, foam core 11 and decorative glass 12.

Step 2: Glue door panel skin 803 and stile/rail door skin 804 together by adhering the extended underneath side of door panel skin 803 and the extended top side of the stile/rail skin 804 to the wood or composite board 6, resulting in a one-piece door skin ready for use. Step 3: Make a fiberglass door using the above materials plus water resistant adhesives (known knowledge)

Step 4: Lightly sand the surface of the one-piece door skin produced in Step 2, apply water resistant adhesive to one side of wood veneer 10 and then bond the wood veneer 10 to the surface of the door skin through the use of a vacuum press.

Step 5: Once the adhesive is cured, apply flush wood sticking 702 on the veneered side to cover the area where the door panel skin 803 and stile/rail skin 804 are conjoined by mechanical or chemical methods. Then install glass 12.

Embodiment 4

This embodiment shows a wood-fiberglass hybrid door constructed of two different types of fiberglass door skins. The first door skin is of one-piece compression molded construction. The second door skin is constructed of a separately compression molded piece and joined together by mechanical or chemical methods. A raised wood molding is applied on the veneered side.

Step 1: Preparation of the following materials: Internal blocks 3, wood stiles/rails 4, wood raised molding 701, one-piece construction door skin 802, natural wood veneer 10, door panel skin 803, stile/rail skin 804, foam core 11 and decorative glass 12.

Step 2: Glue door panel skin 803 and stile/rail door skin 804 together at the location of the 90 degree alternate angle, resulting in a one-piece door skin ready for use. 803 and 804 can also be connected by mechanical or chemical methods.

Step 3: Make a fiberglass door using the above materials plus water resistant adhesives (known knowledge)

Step 4: Lightly sand the surface of the one-piece door skin produced in Step 2, apply water resistant adhesive to one side of wood veneer 10 and then bond the wood veneer 10 to the surface of the door skin through the use of a vacuum press.

Step 5: Once the adhesive is cured, apply wood raised sticking on the veneered side to cover the area where the door panel skin 803 and stile/rail skin 804 are conjoined by mechanical or chemical methods. Then install glass 12.

Embodiment 5

Figure 24:
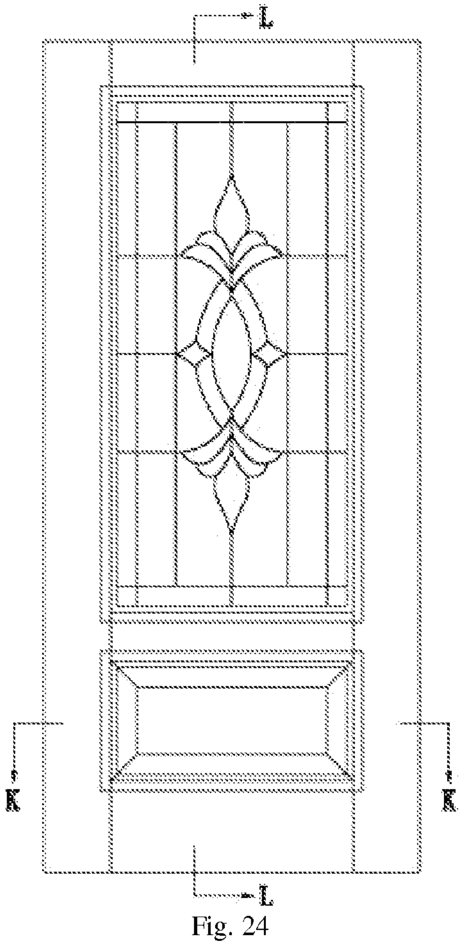
FIG. 24 is a wood-fiberglass hybrid door constructed of one-piece fiberglass door skins and natural wood veneer bonded to one side of the door with applied wood raised molding on the same side. The raised door panel on the veneered side is of solid wood or veneered particle/MDF board.
Figure 25:
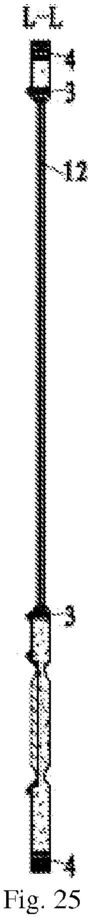
FIG. 25 is a sectional view taken along line L-L in FIG. 24
Figure 26:
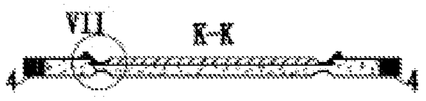
FIG. 26 is a sectional view taken along line K-K in FIG. 24
Figure 27:
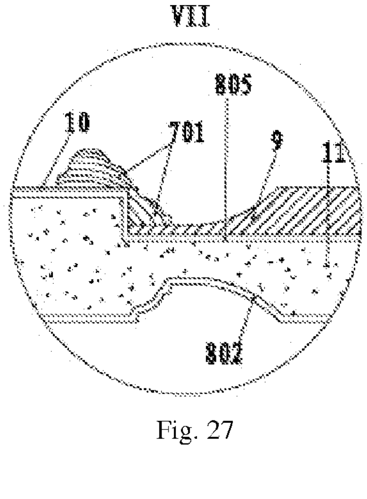
FIG. 27 is an enlarged sectional view taken along line K-K in FIG. 24

This embodiment shows a wood-fiberglass hybrid door constructed of one-piece fiberglass door skins and natural wood veneer bonded to one side of the door with applied wood raised molding on the same side. The raised door panel on the veneered side is of solid wood or veneered particle/MDF board (FIG. 24-FIG. 27)

Step 1: Preparation of the following materials: Internal blocks 3, wood stiles/rails 4, wood raised molding 701, one-piece construction door skin 802 and 805, solid wood or veneered particle board/MDF panel 9, natural wood veneer 10, foam core 11 and decorative glass 12.

Step 2: Make a fiberglass door using the above materials plus water resistant adhesives (known knowledge)

Step 3: Lightly sand the surface of the stiles/rails of the one-piece door skin 805, apply water resistant adhesive to one side of wood veneer 10 and then bond the wood veneer 10 to the sanded areas through the use of a vacuum press.

Step 4: Once the adhesive is cured, place the solid wood/veneered particle board/MDF panel 9 on the door panel location of 805, apply wood raised molding 701 onto 9 to secure it by mechanical or chemical methods. Then install glass 12.

Whereas the invention has been described and illustrated in connection with preferred embodiments thereof, it may be apparent to those of skill in the art that many modifications, substitutions and additions may be made in such detail without departing from the spirit and principles of the present invention.

What is claimed is:

1. A hybrid panel door, comprising:
- a fiberglass door skin having a first surface and a second surface;
- a plurality of wood stiles and rails adhered to the fiberglass door skin to form a one-piece door skin;
- a wood veneer bonded to the first surface of the fiberglass door skin using a water resistant adhesive and a vacuum press;
- wood molding attached to the veneer bonded first surface; and
- a flush wood sticking applied to the veneer bonded first surface to cover an area where the fiberglass door skin and the plurality of wood stiles and rails are conjoined.

2. The door of claim 1 further comprising a glass panel.

3. The door of claim 1 wherein a second wood veneer is bonded to the second surface using a water resistant adhesive and a vacuum press.

4. The door of claim 1 wherein a second fiberglass door skin is attached to the fiberglass door skin.

5. The door of claim 4 wherein a flush wood sticking is applied to the veneer bonded first surface to cover an area where the fiberglass door skin is attached to the second fiberglass door skin.

6. The door of claim 1 wherein the wood molding is raised.

7. The door of claim 1 wherein the wood molding is made of veneered particle MDF board.

8. A method of making a hybrid door, comprising the steps of:

providing a fiberglass door skin having a first surface and a second surface;

adhering a plurality of wood stiles and rails to the fiberglass door skin to form a one-piece door skin;

sanding the first surface of the fiberglass door skin;

applying a water resistant adhesive to a wood veneer;

bonding the wood veneer to the first surface of the fiberglass door skin using a vacuum press;

attaching wood molding to the veneer bonded first surface; and applying a flush wood sticking to the veneer bonded first surface to cover an area where the fiberglass door skin and the plurality of wood stiles and rails are conjoined.

9. The method of claim 8 further comprising installing a glass panel.

10. The method of claim 8 further comprising the step of attaching a second fiberglass skin to the fiberglass skin.

11. The method of claim 10 further comprising the step of applying a flush wood sticking to the veneer bonded first surface to cover an area where the fiberglass door skin is attached to the second fiberglass door skin.

* * * * *